(12) United States Patent
Maddock et al.

(10) Patent No.: US 6,609,372 B2
(45) Date of Patent: Aug. 26, 2003

(54) METHOD AND APPARATUS FOR CONTROLLING THE TEMPERATURE OF AN ENGINE

(75) Inventors: James B. Maddock, Washington, IL (US); Fred Mehdian, Peoria, IL (US); David Tran, Peoria, IL (US)

(73) Assignee: Caterpillar INC, Peoria, IL (US)

( * ) Notice: Subject to any disclaimer, the term of this patent is extended or adjusted under 35 U.S.C. 154(b) by 0 days.

(21) Appl. No.: 09/060,832

(22) Filed: Apr. 15, 1998

(65) Prior Publication Data

US 2001/0047656 A1 Dec. 6, 2001

(51) Int. Cl.[7] .............................................. F02D 23/00
(52) U.S. Cl. ............................ 60/602; 60/600; 60/603
(58) Field of Search .......................... 60/602, 600, 601, 60/603, 608, 605.1, 284, 286, 611; 123/676, 435; 364/431.05, 557, 431.12

(56) References Cited

U.S. PATENT DOCUMENTS

| | | | | |
|---|---|---|---|---|
| 4,114,379 A | * | 9/1978 | Melchior et al. | 60/601 |
| 4,400,944 A | * | 8/1983 | Iwamoto et al. | 60/605.1 |
| 4,428,199 A | * | 1/1984 | Moore et al. | 60/600 |
| 4,473,055 A | * | 9/1984 | Ito et al. | 60/600 |
| 4,509,331 A | * | 4/1985 | Hirabayashi | 60/602 |
| 4,612,770 A | | 9/1986 | Tadokoro et al. | |
| 4,873,961 A | * | 10/1989 | Tanaka | 60/601 |
| 4,953,110 A | * | 8/1990 | Chartrand | 60/602 |
| 4,971,010 A | * | 11/1990 | Iwata | 123/435 |
| 5,036,669 A | | 8/1991 | Earleson et al. | |
| 5,125,235 A | * | 6/1992 | Yanagihara et al. | 60/605.1 |
| 5,211,010 A | * | 5/1993 | Hirota | 60/280 |
| 5,271,229 A | * | 12/1993 | Clarke et al. | 60/605.1 |
| 5,278,762 A | * | 1/1994 | Kawamura | 364/431.05 |
| 5,303,168 A | * | 4/1994 | Cullen et al. | 364/557 |
| 5,377,112 A | * | 12/1994 | Brown, Jr. et al. | 364/431.12 |
| 5,442,920 A | * | 8/1995 | Kamel et al. | 60/602 |
| 5,526,645 A | * | 6/1996 | Kaiser | 60/611 |
| 5,560,208 A | * | 10/1996 | Halimi et al. | 60/608 |
| 5,941,222 A | * | 8/1999 | Braly | 123/676 |
| 6,012,289 A | * | 1/2000 | Deckard et al. | 60/602 |
| 6,256,992 B1 | * | 7/2001 | Lewis, Jr. et al. | 60/603 |

FOREIGN PATENT DOCUMENTS

| FR | 2726038 A1 | 4/1996 |
|---|---|---|
| JP | 61-255220 | * 11/1986 |
| JP | 08109818 A | 4/1996 |
| JP | 08232638 A | 9/1996 |

* cited by examiner

Primary Examiner—Thomas Denion
Assistant Examiner—Tu M. Nguyen
(74) Attorney, Agent, or Firm—W Bryan McPherson III

(57) ABSTRACT

The present invention includes a method and apparatus for controlling the exhaust temperature of an engine is disclosed. The method includes the steps of sensing the exhaust temperature of the engine, determining a desired air pressure in response to the exhaust temperature, and controlling the air flow into the engine in response to the desired air pressure. The apparatus includes an air temperature sensor for sensing an actual exhaust temperature within the exhaust manifold and responsively generating an exhaust temperature signal. The apparatus also includes a controller for receiving the exhaust temperature signal and comparing the exhaust temperature signal to a desired exhaust port temperature, determining a desired air pressure in response to the comparison.

14 Claims, 4 Drawing Sheets

Fig-2-

METHOD AND APPARATUS FOR CONTROLLING THE TEMPERATURE OF AN ENGINE

TECHNICAL FIELD

This invention relates to the controlling of the temperature of an engine, and more particularly, the monitoring and controlling of the exhaust temperature of an engine.

BACKGROUND ART

Controlling the temperature of exhaust from the combustion chamber of an engine is needed in order to enable the engine to run smoothly. If the exhaust temperature is too low, the engine will misfire. If the exhaust temperature is too high, components within the engine will overheat and malfunction which may result in serious damage to the engine. Current techniques to control exhaust temperature include manually adjusting the air flow through the engine by manually adjusting a performance map. However, this is difficult to do manually. Manual control does not respond rapidly to changes in the exhaust temperatures. In addition, if one combustion chamber is producing higher than desired exhaust temperatures the problem may go undetected until there is a component or engine failure.

The present invention is directed to overcoming one or more of the problems as set forth above by dynamically controlling the exhaust temperature of the engine.

DISCLOSURE OF THE INVENTION

In one aspect of the present invention, a method for controlling the exhaust temperature of an engine is disclosed. The method includes the steps of sensing the exhaust temperature of the engine, determining a desired air pressure in response to the exhaust temperature, and controlling the air flow into the engine in response to the desired air pressure.

In an alternative embodiment of the present invention, an apparatus for controlling the exhaust temperature of an engine is disclosed. The apparatus includes an air temperature sensor for sensing an actual exhaust temperature within the exhaust manifold and responsively generating an exhaust temperature signal. The apparatus also includes a controlling means for receiving the exhaust temperature signal and comparing the exhaust temperature signal to a desired exhaust port temperature, determining a desired air pressure in response to said comparison.

BEST MODE FOR CARRYING OUT THE INVENTION

Figure 1:
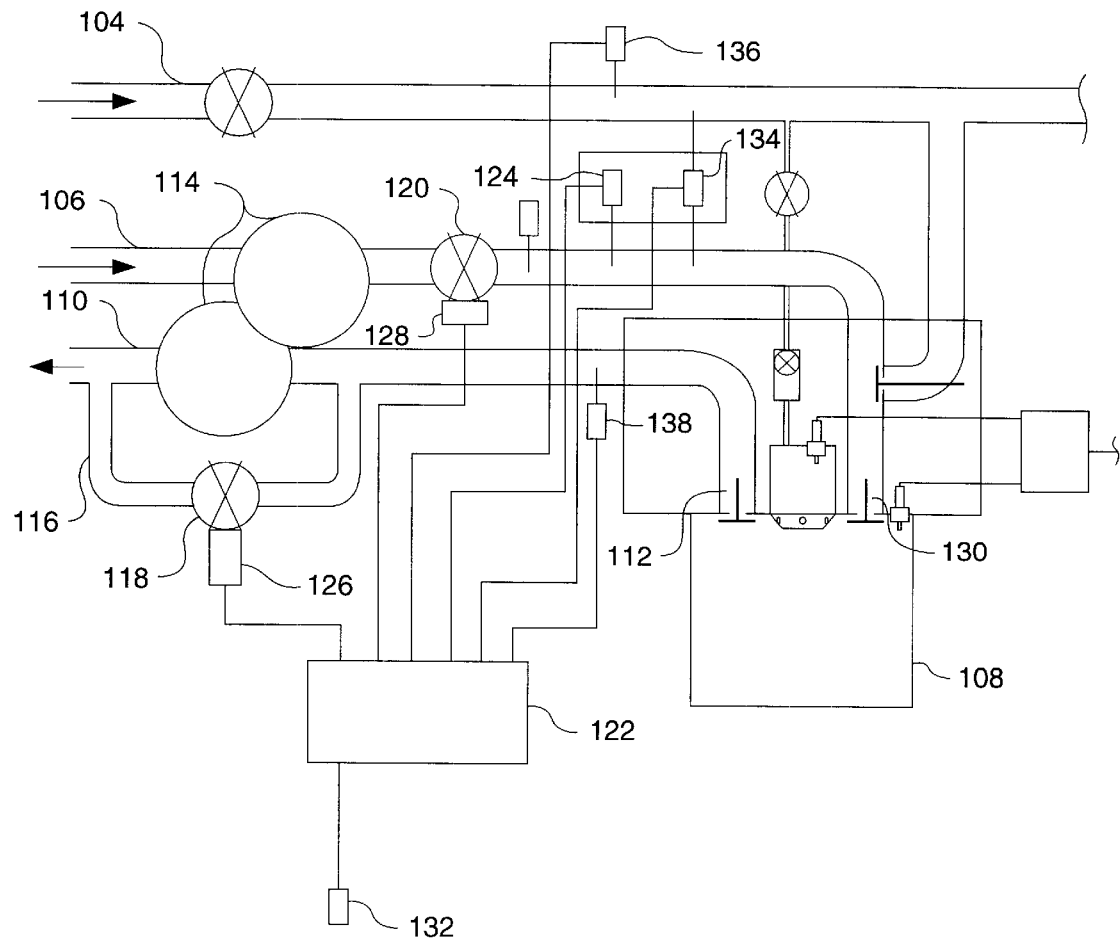
FIG. 1 is a high level diagram of one embodiment of the fuel intake and air intake and exhaust portions of an engine.

The present invention provides an apparatus and method for controlling the exhaust temperature of an engine. FIG. 1 is an illustration of one embodiment of an engine 102. A fuel line 104 is connected to an intake manifold 106 which in turn is connected to an intake port 130 of an engine combustion chamber 108. For illustration purposes, only one combustion chamber 108 is shown; however, as will be apparent to those skilled in the art, the engine 102 may have a plurality of such combustion chambers. An engine exhaust manifold 110 is connected to an exhaust port 112 of the combustion chamber 108. The intake and exhaust manifolds 106, 110 are further connected to a turbocharger 114 having an exhaust bypass 116. The exhaust bypass 116 serves to route part of the engine exhaust around the turbocharger 114.

A choke valve 120 is disposed in the intake manifold 106 and is provided to restrict the volume of air delivered to the combustion chamber(s). A choke actuator unit 128 is mechanically connected to the choke valve 120 and electrically connected to a control unit 122. The control unit 122 delivers a choke control signal to the choke actuator 126 to control the position of the choke valve 120.

A wastegate 118 is disposed in the exhaust bypass 116 for controlling the amount of engine exhaust routed around/through the turbocharger 114. A wastegate actuator 126 is mechanically connected to the wastegate 118 and electrically connected to the electronic control unit 122. The electronic control unit 122 delivers a wastegate control signal to the wastegate actuator 126 to control the position of the wastegate.

An engine speed sensor 132 is electrically connected to the electronic control unit 122. The speed sensor 132 can be any type of sensor that accurately produces an electrical signal in response to engine crankshaft speed. For example, in one embodiment, the speed sensor 132 is mounted on an engine flywheel housing (not shown) and produces a digital speed signal in response to the speed of the flywheel (not shown) mounted on an engine crankshaft (not shown).

A fuel pressure sensor 134 is disposed between the fuel line 104 and the intake manifold 106. The fuel pressure sensor 134 is electrically connected to the control unit 122. The fuel pressure sensor 134 produces a signal in response to a pressure differential between the fuel line 104 and the intake manifold 106.

A fuel temperature sensor 136 is disposed in the fuel line 104 and is electrically connected to the control unit 122. The fuel temperature sensor 136 produces a signal in response to the temperature of the fuel being delivered to the combustion chamber 108.

An air pressure sensor 124 is disposed in the intake manifold 106 and is electrically connected to the control unit 122. The air pressure sensor 124 produces an air pressure signal in response to the actual absolute air pressure in the air intake manifold 106.

An exhaust temperature sensor 138 is disposed in the exhaust manifold 110 and is electrically connected to the control unit 122. The exhaust temperature sensor 138 produces a signal in response to the temperature in the exhaust manifold 110. In one embodiment there is a single air temperature sensor 138 located in the exhaust manifold 110, between the exhaust port 112 and the exhaust bypass 116. In the preferred embodiment, there is one air temperature sensor 138 for each exhaust port 112 of the engine 102, and the temperature sensors are located between the exhaust bypass 116 and the respective exhaust port 112.

In the preferred embodiment, an electronic control unit 122 is used as the controlling means. The electronic control unit 122 receives the exhaust temperature signal and compares the exhaust temperature signal to a desired exhaust port temperature. The control unit 122 then determines a desired air pressure in response to the comparison. The control unit 122 determines a position of at least one of a choke valve 120 and a wastegate 118 in response to desired air pressure, and responsively delivers a choke valve position signal to the choke valve actuator 128 and a wastegate valve position signal to the wastegate actuator 126.

Figure 2:
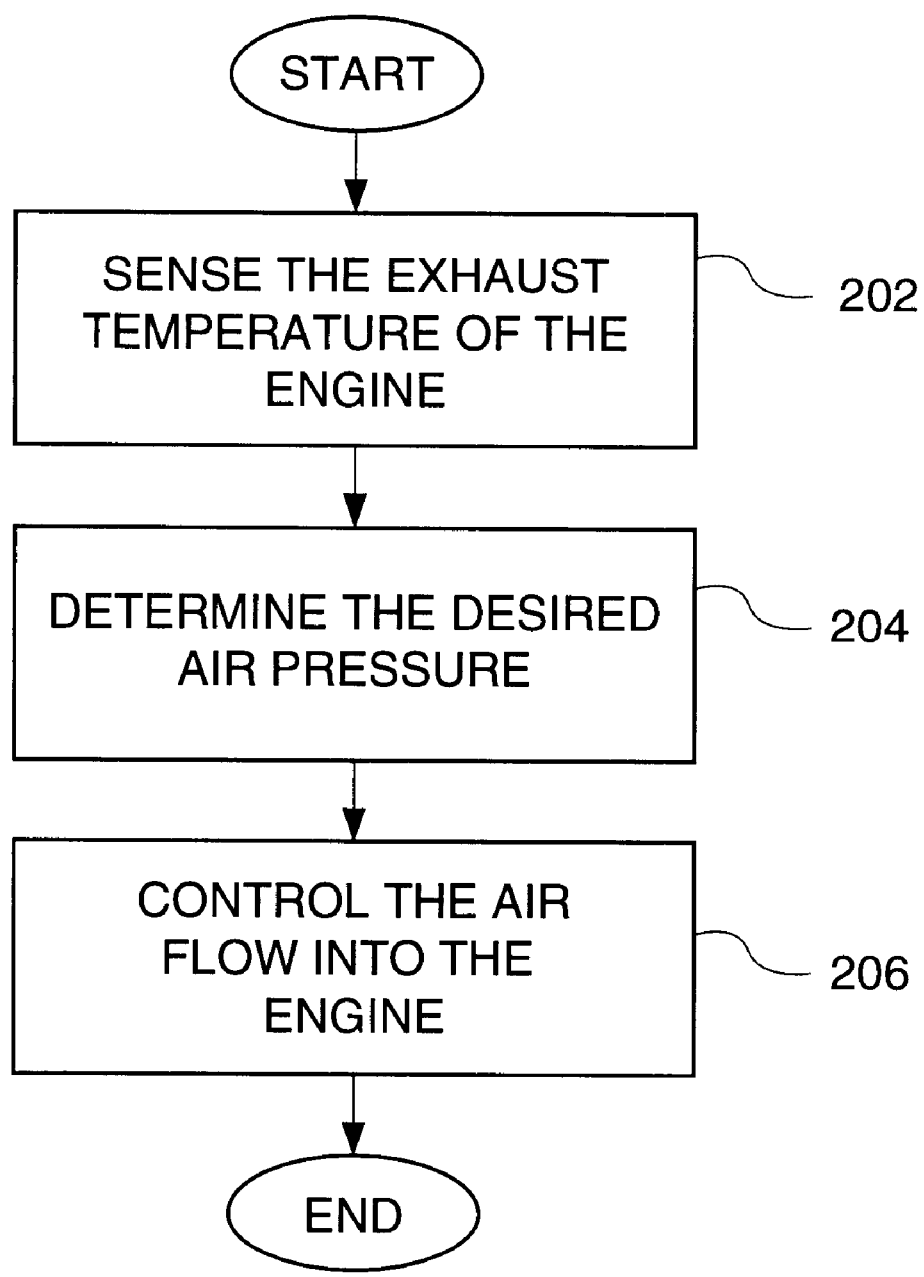
FIG. 2 is a flow diagram illustrating the method of the present invention.

FIG. 2 illustrates a flow diagram of the method of the present invention. In a first control block 202 the exhaust temperature of the engine 102 is sensed. In the preferred embodiment the exhaust temperature of each of the exhaust ports is sensed by the temperature sensors 138, and an exhaust temperature signal is delivered to the control unit 122. In an alternative embodiment the exhaust temperature of one exhaust port 112 may be sensed. In yet another embodiment the exhaust temperature of the exhaust manifold 110 may be determined.

In a second control block 204 a desired air pressure is determined in response to the exhaust temperature. In the preferred embodiment the desired air pressure is determined by first calculating a fuel flow, correcting the fuel flow in response to the sensed temperature, and determining a desired air/fuel ratio based on the corrected fuel flow and engine speed. The desired air pressure is then determined in response to the desired air/fuel ratio, the corrected fuel flow, and the engine speed, as illustrated in the flow diagram of FIG. 3. In a first control block 302, the uncompensated fuel flow is determined. The uncompensated fuel flow may be determined in response to sensing the air pressure within the intake manifold, the fuel temperature, and the fuel pressure. The uncompensated fuel flow is then calculated from the following equation:

$$\text{Fuel Flow} = \sqrt{(DP+AP)*DP/FT}*FC$$

Where:
DP=Differential Fuel Pressure
(Fuel Pressure−Air Pressure)
AP=Air Pressure
FT=Fuel Temperature
FC=Fuel Constant In a second control block 304 the fuel flow is modified in response to the sensed exhaust port temperature. In one embodiment a corrected fuel flow is determined using the following equation:

$$\text{Corrected Flow} = \text{Fuel Flow}*CF$$

where CF is the correction factor.

Figure 4:
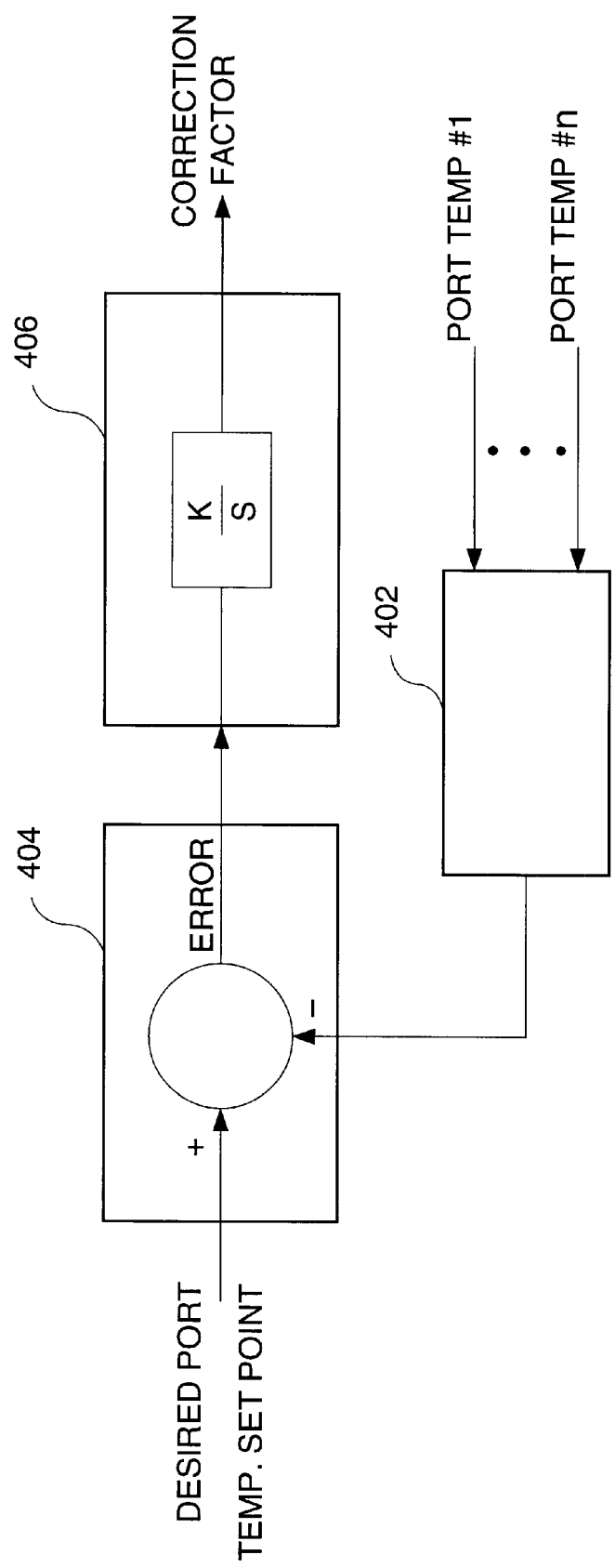
FIG. 4 is an illustration of the method for determining a correction fuel factor.

The correction factor (CF) is based upon the sensed exhaust port temperature as shown in FIG. 4. In block 402 the sensed temperatures are analyzed. In the preferred embodiment the average temperature of the exhaust temperatures is determined. The average temperature is then compared with an desired exhaust port temperature in block 404. The desired exhaust port temperature is dependent on the size of the engine and the operating characteristics of the engine. In one embodiment, the desired exhaust temperature may vary between 530 and 540 degrees Fahrenheit, and therefore the desired exhaust port temperature may be set to 535 degrees Fahrenheit plus or minus 5 degrees. The 10 degree range, between 530 and 540, may be used to create a deadband around the center temperature 535 degrees Fahrenheit. That is, if the averaged temperature is not greater than 540 or less than 530 degrees Fahrenheit, then no correction is needed, and the correction factor remains unchanged. The desired exhaust port temperature may be modified based on the altitude the engine is operating, or the load the engine is experiencing.

In the preferred embodiment a difference (or error) is determined between the desired port exhaust temperature and the average port exhaust temperature. The error is then delivered to block 406, and the correction factor is determined in response to the comparison of the desired and averaged exhaust temperatures. In the preferred embodiment, the error is multiplied by a gain value K. The gain may be static, or may vary with the exhaust temperature of the port. For example, one gain value may be used when the averaged temperature is less than the desired exhaust port temperature, another gain value may be used when the averaged temperature is greater than desired, and a third gain value when any exhaust port temperature is much greater than the desired temperature. The situation where one exhaust port temperature is much greater than the desired temperature will be discussed below. The product of the gain and the error is then integrated to determine the correction factor.

In an alternative embodiment one sensor may be used to sense the exhaust temperature. The temperature sensor may be located either close to one of the exhaust ports, or in the exhaust manifold 110 closer to the exhaust bypass 116. In the event only one sensor is used, then the sensed temperature is used for analysis instead of an averaged temperature.

Figure 3:
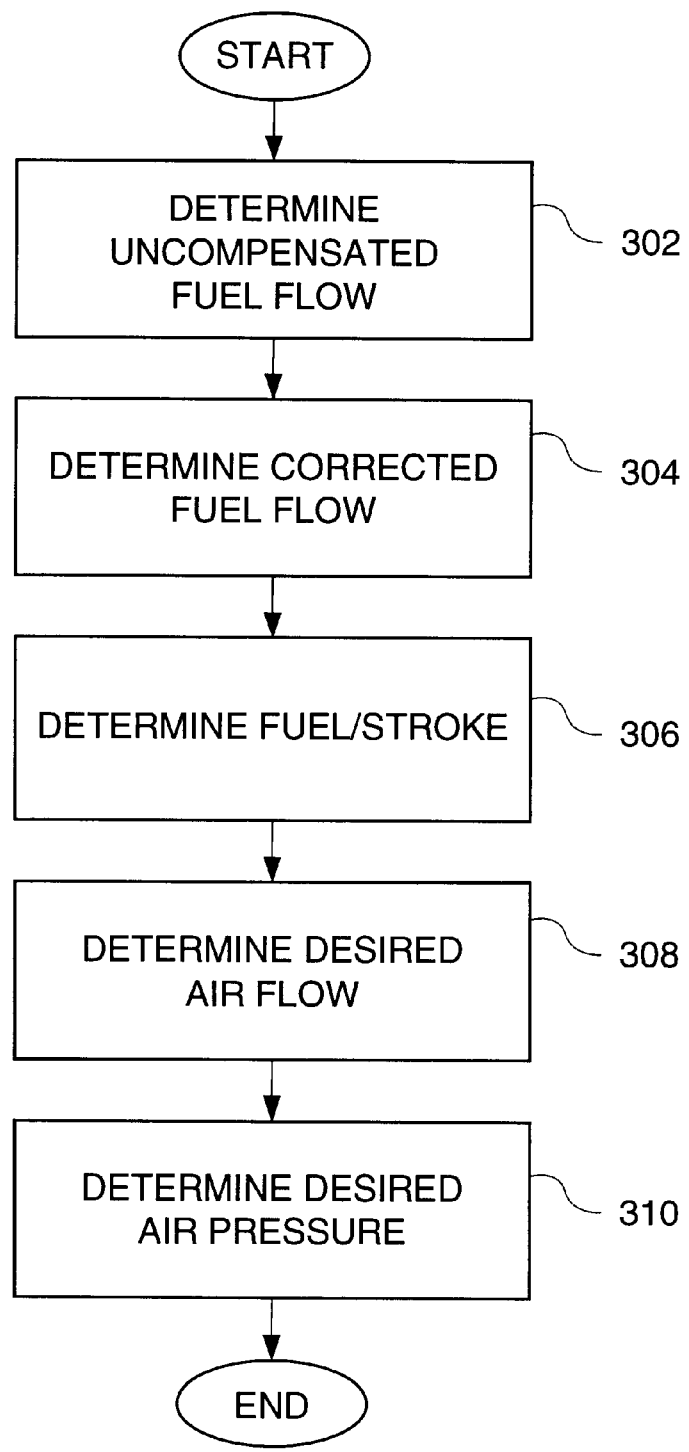
FIG. 3 is a flow diagram illustrating the method of determining a desired air pressure.

Referring again to the second control block 304 of FIG. 3, the correction factor is then multiplied by the uncompensated fuel flow to determine the corrected, or compensated, fuel flow.

In a third control block 306 a fuel per stroke (F/S) is calculated based on the following equation:

$$F/S = (CLPM\_FF*2)/(N*Cyl)$$

Where:
CLPM_FF is the corrected fuel flow
N is the engine speed
Cyl is the number of cylinders.

The fuel/stroke is then used in conjunction with a desired air/fuel ratio map and the engine speed, to determine the desired air/fuel ratio. The use of air/fuel ratio maps are well known in the art and will not be discussed further.

In control block 308 the desired air flow is determined. The desired air/fuel ratio is multiplied by the corrected fuel flow to determine a desired air flow. In a fifth control block 310 the desired air pressure is determined. One embodiment of the calculation of the desired air pressure is shown below:

$$\text{Desired Air Pressure} = (DAF*AT)/(\text{Speed}*\text{Vol. Eff.})$$

Where:
DAF=Desired Air Flow
AT=Air Temperature
Speed=Engine Speed
Vol. Eff.=Volumetric Efficiency Returning to FIG. 2, in a third control block 206, the desired air pressure is then used to control the air flow into the engine; thereby controlling the exhaust temperature of the engine 102. The desired air pressure may be used to control the position of the wastegate and the choke valve in a manner well known in the art.

In an alternative embodiment, the exhaust temperature of each exhaust port is compared with a temperature threshold. If any one of the exhaust port temperatures exceeds the temperature threshold, then the temperature of that port is used to determine the desired air pressure instead of the average temperature of the ports. Therefore, if any single cylinder is running a lot hotter than desired, e.g., the exhaust port temperature exceeds a predetermined temperature threshold, then the very hot exhaust port temperature is compared with the desired exhaust port temperature. The difference between the temperatures is then used to determined the correction factor, and the correction factor is then used as before, to determine the corrected fuel flow, ultimately resulting in a desired air pressure based on the very hot exhaust port temperature.

Desired air pressure is determined in response to the overly hot exhaust port temperature.

In an alternative embodiment, the determination of the desired air pressure in response to the sensed exhaust temperatures is only done when the engine is less than 50% loaded. That is, when the engine load exceeds 50%, control of the correction factor, and the value of the correction factor, is transferred to a combustion controller. One basis of determining engine load is by measuring engine power. Methods for measuring the power produced by an engine are well known to those skilled in the art, and will not be elaborated on here.

In another embodiment the desired air pressure may be modified directly in response to the sensed exhaust temperatures. The uncompensated fuel flow would be multiplied by 1, instead of a correction value (CF), to achieve the compensated fuel flow. The desired air pressure would be calculated as described in the flow diagram of FIG. 2. When the desired air pressure was determined as before, it would then be modified based on the sensed exhaust temperature. That is, the corrected desired air pressure would be determined by the following equation:

Corrected Desired Air Pressure=Desired Air Pressure*CF*

Where CF is the Correction Factor. The correction value is determined as described above, and illustrated in FIG. 4. Therefore the corrected desired air pressure would account for changes in exhaust temperatures.

Portions of the present invention are embodied in a microprocessor based system which utilizes arithmetic units to control process according to software programs. In the preferred embodiment the microprocessor based system is included in the control unit 122.

INDUSTRIAL APPLICABILITY

The present invention provides a method and apparatus for controlling the exhaust temperature of an engine. The exhaust temperature of the engine is sensed. In the preferred embodiment, temperature sensors are used to sense the temperature of each of the exhaust ports. The sensed temperatures are then used to determine a desired air pressure. In one embodiment the temperatures are averaged together and compared with a desired exhaust port temperature. The desired exhaust port temperature may be dynamically determined based on the load of the engine, or the environment the engine is operating in, e.g., the altitude of the engine.

The desired air pressure of the engine may be determined based on the sensed temperatures. Then the air flow into the engine is controlled based on the desired air pressure. The desired air pressure may be controlled by modifying the position of the wastegate or the choke valve, or both, such that the actual air pressure of the engine matches the desired air pressure.

In yet another alternative embodiment, the turbocharger 114 may be a variable geometry turbocharger. A variable geometry turbocharger has vanes (not shown) that are adjustable to restrict the amount of air flow into the engine. In one embodiment, instead of controlling the position of a choke valve or wastegate, the position of the vanes of the variable geometry turbocharger may be modified in response to the determined desired air pressure.

Other aspects, objects and advantages of the present invention can be obtained from a study of the drawings, the disclosure, and the claims.

What is claimed is:

1. A method for controlling the exhaust temperature of an engine, comprising:

sensing the exhaust temperature of the engine;

determining a desired air pressure in response to the exhaust temperature;

controlling the air flow into the engine in response to said desired air pressure; thereby controlling the exhaust temperature;

wherein the engine includes a plurality of exhaust ports, and the step of sensing the exhaust temperature of the engine further comprises the step of determining a temperature of at least one of said plurality of exhaust ports; and wherein the step of determining a temperature further comprises the step of determining the exhaust temperature of each of said plurality of exhaust ports.

2. A method as set forth in claim 1, wherein the step of determining a desired air pressure in response to said exhaust temperature includes the steps of:

determining an average of the exhaust temperatures;

comparing said average to a desired exhaust port temperature; and determining said desired air pressure in response to said comparison.

3. A method as set forth in claim 2, further comprising the steps of:

determining said desired exhaust port temperature in response to a load of the engine.

4. A method as set forth in claim 2, further comprising the steps of:

determining said desired port temperature in response to an altitude of the engine.

5. A method as set forth in claim 2, further comprising:

determining one of said exhaust port temperatures exceeds a predetermined threshold; and determining said desired air pressure in response to said predetermined threshold being exceeded.

6. A method for controlling the exhaust temperature of an engine, comprising:

sensing the exhaust temperature of the engine;

comparing said exhaust temperature with a desired exhaust temperature;

determining a fuel flow of said engine in response to said exhaust temperature comparison;

determining a desired air pressure in response to said fuel flow;

controlling the air flow into the engine in response to said desired air pressure;

thereby controlling the exhaust temperature;

wherein the step of controlling said air flow into said engine further includes one of the step of increasing said air flow in response to said sensed exhaust temperature exceeding said desired exhaust temperature;

the step of decreasing said air flow in response to said sensed exhaust temperature exceeding said desired exhaust temperature;

wherein the step of determining said fuel flow further comprises the step of determining a corrected fuel flow in response to said exhaust temperature comparison; and wherein the step of determining said corrected fuel flow further comprises the steps of:

determining a correction factor in response to said exhaust temperature comparison, said correction factor varying in magnitude in response to a difference between said exhaust temperature and said desired exhaust temperature; and determining said corrected fuel flow in response to said correction factor.

7. A method as set forth in claim 6, wherein said desired exhaust temperature is a predetermined temperature.

8. A method, as set forth in claim 7, wherein said desired exhaust port temperature is dynamically determined.

9. A method, as set forth in claim 8, wherein said desired exhaust port temperature is determined in response to a load of the engine.

10. A method, as set forth in claim 9, wherein said desired exhaust port temperature is determined in response to an altitude of the engine.

11. A method as set forth in claim 10, wherein the engine includes a plurality of exhaust ports, and the step of sensing the exhaust temperature of the engine further comprises the step of determining a temperature of at least one of said plurality of exhaust ports.

12. A method as set forth in claim 11, wherein the step of determining a temperature further comprises the step determining the exhaust temperature of each of said plurality of exhaust ports.

13. A method as set forth in claim 12, wherein the step of determining a desired air pressure in response to said exhaust temperature includes the steps of:

determining an average of the exhaust temperatures;

comparing said average to a desired exhaust port temperature; and determining said desired air pressure in response to said comparison.

14. A method, as set forth in claim 13, wherein the step of controlling said air flow further comprises the step of determining at least one of a position of a choke valve and a position of a wastegate in response to said exhaust temperature comparison.

* * * * *